United States Patent
Hisano et al.

[11] Patent Number: 5,964,063
[45] Date of Patent: Oct. 12, 1999

[54] MOTOR-VEHICLE DOOR HAVING WINDOW WINDER, METHOD OF ASSEMBLING THE DOOR, AND WINDOW SASH ASSEMBLY SUITABLE FOR USE IN THE DOOR

[75] Inventors: Masaya Hisano; Koichi Kunitake; Yasuki Ohkanemasa, all of Sayama, Japan

[73] Assignee: Honda Giken Kogyo Kabushiki Kaisha, Tokyo, Japan

[21] Appl. No.: 08/893,165

[22] Filed: Jul. 15, 1997

[30] Foreign Application Priority Data

Jul. 22, 1996 [JP] Japan ................................ 8-192508
Jul. 22, 1996 [JP] Japan ................................ 8-192511

[51] Int. Cl.⁶ .................................................. B60J 5/04
[52] U.S. Cl. ........................................ 49/502; 49/352
[58] Field of Search ........................ 49/352, 502, 348, 49/349, 374; 296/146.5

[56] References Cited

U.S. PATENT DOCUMENTS

| | | |
|---|---|---|
| 4,416,088 | 11/1983 | Feucht et al. |
| 4,924,630 | 5/1990 | Lomansney et al. ............ 49/502 |
| 5,033,236 | 7/1991 | Szerdahelyi et al. ............ 49/502 |
| 5,226,259 | 7/1993 | Yamagata et al. .............. 49/502 |
| 5,325,632 | 7/1994 | Djavairian et al. ............. 49/502 |
| 5,351,443 | 10/1994 | Kimura et al. ................. 49/502 |

FOREIGN PATENT DOCUMENTS

| | | |
|---|---|---|
| 3-14279 | 2/1991 | Japan . |
| 3-88914 | 9/1991 | Japan . |
| 3-123086 | 12/1991 | Japan . |

*Primary Examiner*—Jerry Redman
*Attorney, Agent, or Firm*—Merchant & Gould P.C.

[57] ABSTRACT

A motor-vehicle door includes a door body composed of a door frame member and inner and outer door panels attached to opposite sides of the door frame member, and a window sash assembly connected to an upper part of the door frame member. The window sash assembly includes a sash body, a window panel vertically movably held in the sash body, and a window regulator mounted on a lower portion of the sash body for moving the window panel up and down and holding it in position. Since the window panel and the window regulator are assembled in the window sash assembly as an integral part of the window sash assembly, the motor-vehicle door having such window sash assembly is simple in construction and can be assembled easily, precisely and less costly. Methods of assembling the motor-vehicle door are also disclosed.

19 Claims, 13 Drawing Sheets

MOTOR-VEHICLE DOOR HAVING WINDOW WINDER, METHOD OF ASSEMBLING THE DOOR, AND WINDOW SASH ASSEMBLY SUITABLE FOR USE IN THE DOOR

BACKGROUND OF THE INVENTION

1. Field of the Invention

The present invention relates generally to a door of a motor vehicle, and more particularly to a motor-vehicle door having a window winder or regulator, a method of assembling the motor-vehicle door, and a window sash assembly particularly suitable for use in the motor-vehicle door.

2. Description of the Related Art

Motor-vehicle doors of the type concerned include a door body composed of an inner door panel and an outer door panel, a window sash or frame extending upwardly from an upper edge of the door body, a movable window panel (glass pan) held in the window sash, and a window winder or regulator operative to move the window panel up and down and hold it in position for opening and closing an window opening defined between the window sash and the door body.

Several known examples of such motor-vehicle doors are disclosed in Japanese Utility Model Laid-open Publications Nos. HEI 3-14279, HEI 3-88914 and HEI 3-123086, and U.S. Pat. No. 4,416,088.

In the disclosed motor-vehicle doors, the window regulator is mounted on the door body side, and more particularly on the inside surface of, for example, an outer door panel. The window regulator thus mounted is structurally independent from the window sash.

In general, the known motor-vehicle doors are assembled through the processes enumerated below:

(1) attaching a door winder or regulator to the inside surface of, for example, an outer door panel;
(2) assembling together the outer door panel and an inner door panel to form a door body;
(3) attaching a window sash or frame to an upper part of the door body; and
(4) providing the window sash with a window panel (glass pan), thereby obtaining an assembled motor-vehicle door.

Due to a relatively large number of assembling processes needed, the known motor-vehicle doors are laborious to assembly and rendered costly to manufacture.

In addition, since the window regulator mounted on the outer door panel is structurally independent from the window sash, the window panel held in the window sash is liable to be improperly aligned due to an assembling error between the window regulator and the window panel, and an assembling error between the window panel and the window sash. In order to obtain a properly aligned window panel, an adjustment is made to adjust the relative position between the window panel, the window regulator and the window sash after the above-mentioned assembling processes (1)(4) are completed. The adjustment, however, incurs an additional cost. This problem becomes serious when the window panel is a curved window panel.

Another problem is that a mount base used for attaching the window regulator to the outer door panel, and a guide mechanism and members used for guiding the window panel increase the number of structural components of the door body, require an additional positioning process, and render the door complicated in construction and costly to manufacture.

SUMMARY OF THE INVENTION

With the foregoing drawbacks of the prior art in view, an object of the present invention is to provide a motor-vehicle door having a window winder or regulator, which door is simple in construction and easy to assemble with high accuracy, and can be manufactured less costly.

Another object of the present invention is to provide a simple method of assembling the motor-vehicle door.

A further object of the present invention is to provide a window sash assembly which is particularly suitable for use in the production of a motor-vehicle door which is simple in construction and easy to assembled with high accuracy, and can be manufactured less costly.

According to a first aspect of the present invention, there is provided a motor-vehicle door which comprises: a door body including an outer door panel, an inner door panel and a door frame member connected together, with the door frame member disposed between the outer and inner door panels; and a window sash assembly connected to an upper part of the door frame member. The window sash assembly includes a sash body, a window panel vertically movably held in the sash body, and a window regulator mounted on a lower portion of the sash body for moving the window panel up and down and holding it in position.

The window panel and the window regulator are assembled in the window sash assembly as an integral part of the window sash assembly. The motor-vehicle door having such window sash assembly is simple in construction and can be assembled easily, precisely and less costly. The window panel mounted on the sash body together with the window regulator can be adjusted while they are in a condition of actual use. Once the window sash assembly is assembled on the door body, the window panel is automatically placed in a ready-to-use condition where the window panel can be raised and lowered in immediate response to operation of the window regulator.

Preferably, each of the outer and inner door panels is releasably connected to a corresponding one of opposite sides of the door frame member by means of a snap-fit engagement between a plurality of locking projections on the do or panel and mating locking holes in each side of the door frame member. The door panels can, therefore, be readily removed from the door frame member when maintenance of the window regulator is needed.

In one preferred form of the invention, the sash body has a generally inverted U-shaped configuration including a front vertical frame portion and a rear vertical frame portion. The window sash assembly further includes a front run channel extending continuously and downwardly from a lower end of the front vertical frame portion, and a rear run channel extending continuously and downwardly from a lower end of the rear vertical frame portion. The window panel has a front edge portion and a rear edge portion received in and guided along the front vertical frame portion and the front run channel, and the rear vertical frame portion and the rear run channel, respectively, as the window panel moves up and down. The window regulator has a drive unit mounted on one of the front run channel and the rear run channel via a bracket for raising and lowering the window panel. The bracket used for supporting thereon the drive unit also functions as a joint member which joins together the one run channel and a corresponding one of the front and rear vertical frame portions. By using the bracket, it is possible to reduce the number of parts of the motor-vehicle door.

Preferably, the window sash assembly further includes a door mirror attachable to the bracket mounted on the front run channel. The door sash body has a slanted front end portion spaced forwardly from the front run channel, and the bracket has a portion extending between the slanted front end portion of the door sash body and the front run channel so as to define, between the slanted front end portion of the door sash body and the portion of the bracket, a substantially triangular opening. The door mirror is attached to the bracket via a substantially triangular mirror base fitted in the triangular opening.

It is preferable that the drive unit includes a drive pulley rotatably mounted on the bracket and an endless drive wire connected to the window panel and drivable by the drive pulley to move the window panel up and down in response to rotation of the drive pulley. The drive pulley has a plurality of hemispherical recesses formed in a circumferential surface thereof, and the drive wire has a number of spherical beads attached to a continuous wire strand at regular intervals and receivable in the hemispherical recesses in the drive pulley. The window regulator further includes a plurality of guide pulleys for guiding the drive wire to travel along a predetermined path. The guide pulleys include a first guide pulley rotatably mounted on the front run channel, a second guide pulley rotatably mounted on the rear run channel, a third guide pulley rotatably mounted on the rear run channel at a position directly above the second guide pulley, and a fourth guide pulley rotatably mounted on the bracket at a position directly above the first guide pulley. The drive wire further includes a first longitudinal portion movable along a path extending between the first and fourth guide pulleys, a second longitudinal portion movable along a path extending between the second and third guide pulleys, a first slider attached to the first longitudinal portion of the drive wire and linked with the window panel, and a second slider attached to the second longitudinal portion of the drive wire and linked with the window panel. In response to ration of the drive pulley, the first and second sliders concurrently move upwardly or downwardly to thereby raise or lower the window panel.

According to a second aspect of the present invention, there is provided a method of assembling a motor-vehicle door which comprises the steps of: providing a window sash assembly including a sash body, a window panel vertically movably held in the sash body, and a window regulator mounted on a lower portion of the sash body for moving the window panel up and down and holding it in position; assembling the window sash assembly onto an upper part of a door frame member; and, thereafter, assembling an outer door panel and an inner door panel onto opposite sides of the door frame member.

The assembling method having only two assembling steps is simple and hence can be achieved easily in a relatively short period of time. The motor-vehicle door can, therefore, be assembled easily and less costly.

In the case where the inner door panel has a separate inner lining, the method further includes a step of attaching an inner door lining to the inner door panel after the last-mentioned assembling step.

In an alternate form of the present invention, there is provided a method of assembling a motor-vehicle door which comprises the steps of providing a window sash assembly including a sash body, a window panel vertically movably held in the sash body, and a window regulator mounted on a lower portion of the sash body for moving the window panel up and down and holding it in position; assembling together an outer door panel, an inner door panel and a door frame member such that the door frame member is disposed between the outer and inner door members; and, thereafter, assembling the window sash assembly onto an upper part of door frame member. The method may further includes a step of attaching an inner door lining to the inner door panel, either after the first-mentioned assembling step, or after the last-mentioned assembling step.

The above and other objects, features and advantages of the present invention will become manifest to those versed in the art upon making reference to the detailed description and accompanying sheets of drawings in which preferred structural embodiments incorporating the principles of the present invention are shown by way of illustrative examples.

DETAILED DESCRIPTION

Figure 1:
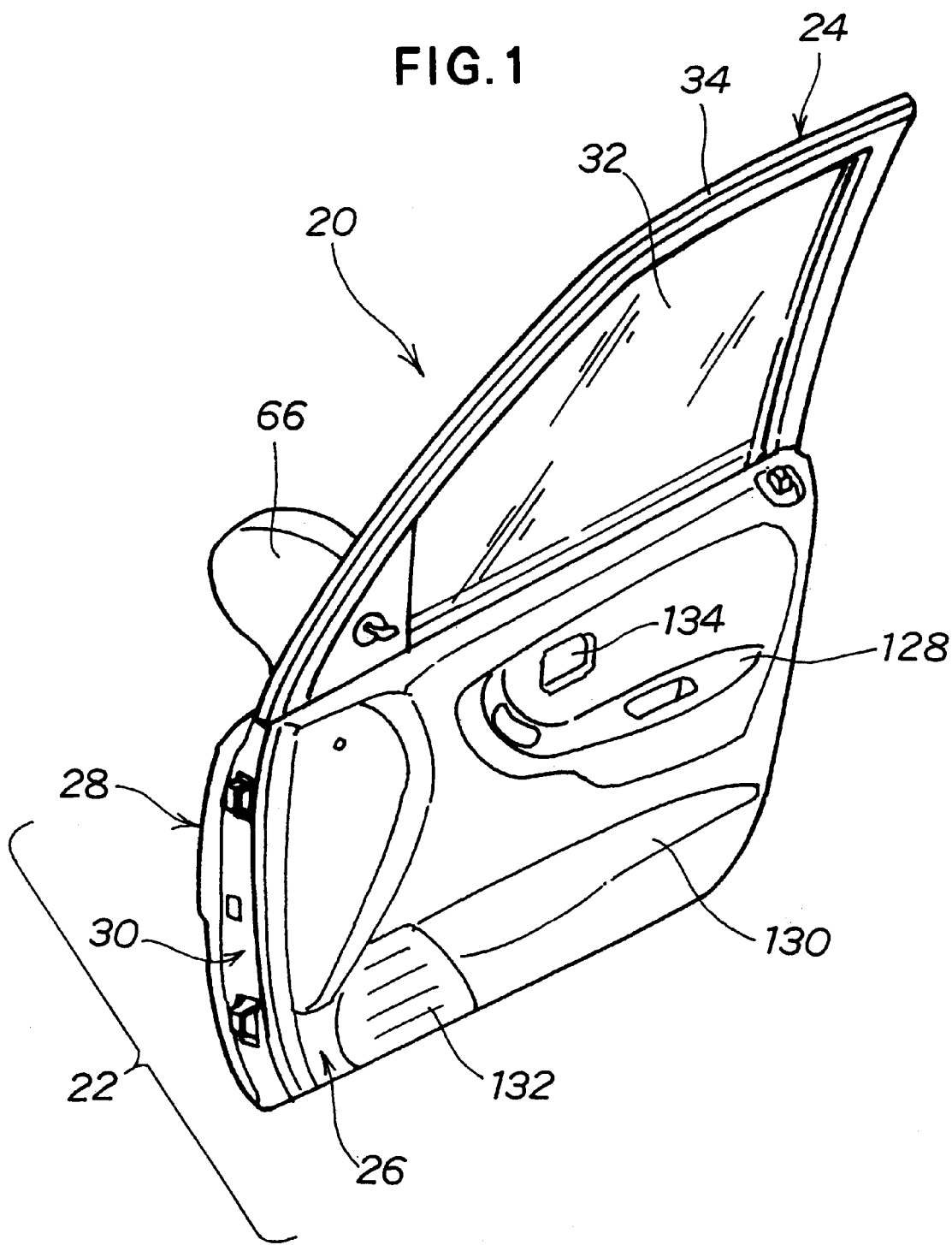
FIG. 1 is a perspective view of a motor-vehicle door according to the present invention.
Figure 2:
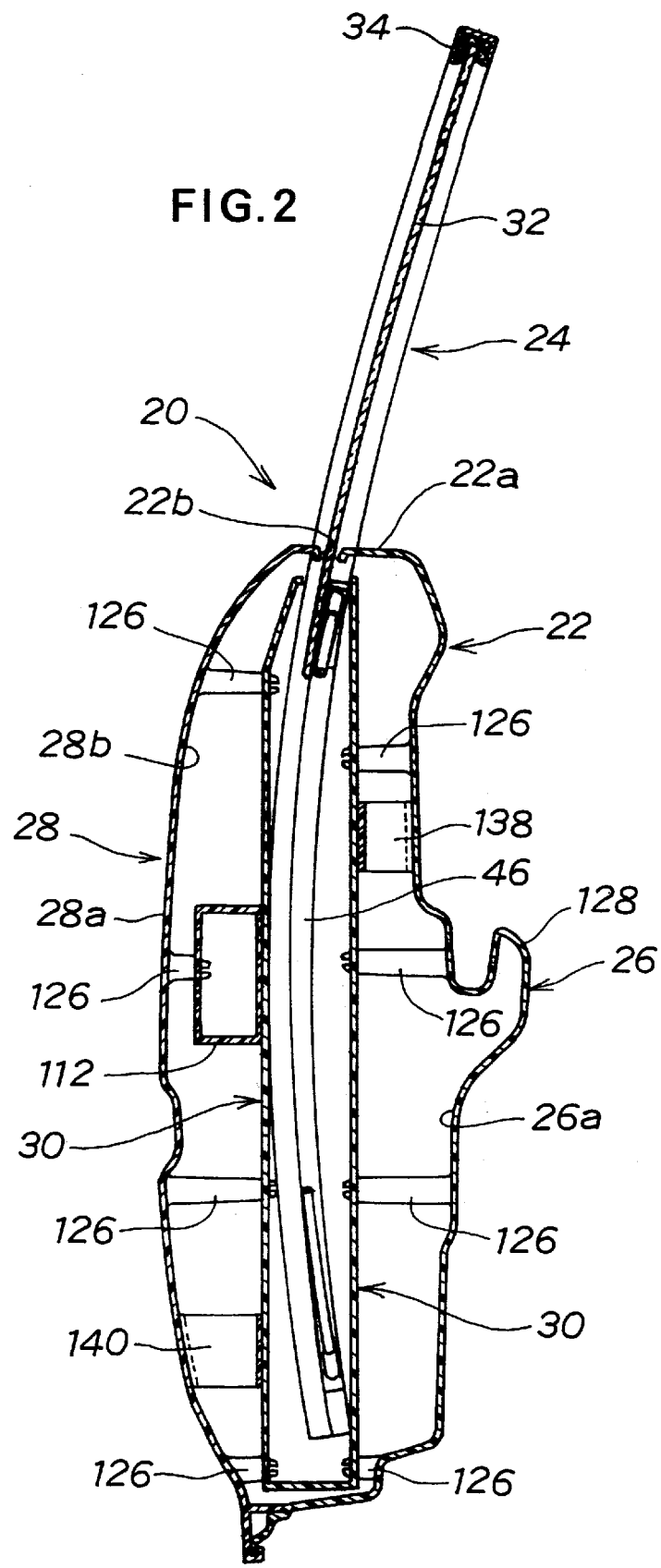
FIG. 2 is a vertical cross-sectional view of the motor-vehicle door.

FIGS. 1 and 2 show a motor-vehicle door 20 according to the present invention. The door 20 in the illustrated embodiment is a front side door of a motor vehicle and generally comprises a door body 22 and a window sash assembly 24 mounted on an upper part of the door body 22 with its lower part received inside the door body 22. The door body 22 is composed of an inner door panel 26, an outer door panel 28 and a door frame member 30 that are assembled together, with the door frame member 30 disposed between the inner and outer door panels 26, 28. The window sash assembly 24 is attached to an upper end of the door frame member 30 and includes a window panel (glass pane) 32 and a window winder or regulator 33 (FIG. 15) for raising and lowering the window panel 32. As will be understood from the following description, the window panel 32 and the window regulator 33 are assembled as an integral part of the door sash assembly 24.

For better understanding of the present invention, description will be first given of the window sash assembly 24.

Figure 8:
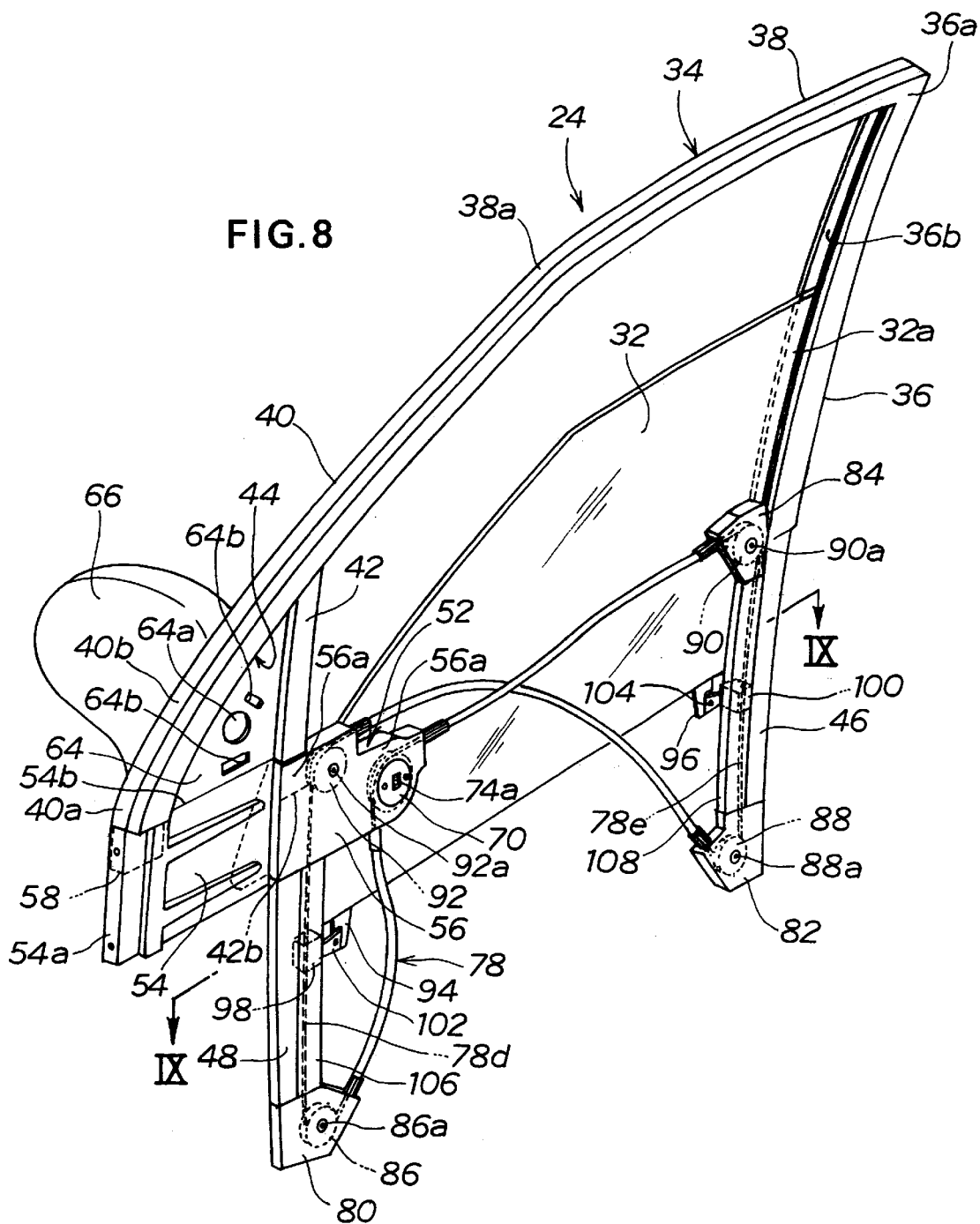
FIG. 8 is an enlarged perspective view of a window sash assembly of the motor-vehicle door shown in FIG. 1.

As shown in FIG. 8, the window sash assembly 24 includes a sash body 34 projecting upwardly from an upper edge 22a (FIG. 2) of the door body 22. The sash body 34 has a generally inverted U shape and includes a generally straight rear vertical frame portion 36 at a rear end thereof, a generally horizontal upper frame portion 38 extending forwardly from an upper end 36a of the rear vertical frame portion 36, and a slanted front frame portion 40 extending forwardly and downwardly from a front end 38a of the upper frame portion 38. The window sash body 34 has a one-piece structure in which all of the frame portions 36, 38, 40 are formed integrally with each other.

The frame portions 36, 38, 40 are channel-shaped and form the so-called "run channels" each having a guide groove (only the groove 36b formed in the rear frame portions 36 being shown in FIG. 8) opening inwardly of the sash body 34 for receiving and guiding a peripheral edge portion of the window panel (glass pane) 32. For instance, the guide groove 36b formed in the rear vertical frame portion 36 receives a rear edge portion 32a of the window panel 32 and guides the rear edge portion 32a as the window panel 32 is raised and lowered. Similarly, the non-illustrated guide grooves formed respectively in the upper frame portion 38 and the front frame portion 40 are receptive of upper and front edge portions of the window panel 32, respectively, so that a window opening defined between the sash body 34 and the upper edge 22a of the door body 22 can be opened and closed by the window panel 32.

In the illustrated embodiment, the window sash assembly 24 further includes a front vertical frame portion 42 extending downwardly from a front part of the front frame portion 40 in parallel spaced relation to the rear vertical frame portion 36 and a lower end of the front frame portion 40. The front vertical frame portion 42 has a lower end lying substantially flush with a lower end of the rear vertical frame portion 36. The front vertical frame portion 42 is also channel-shaped and has a guide groove 42a (FIG. 10) opening toward the guide groove 36b of the rear vertical frame portion 36 for receiving and guiding a front edge portion 32b (FIG. 9) of the window panel 32 as the window panel 32 moves up and down. The front part of the front frame portion 40 and the front vertical frame portion 42 jointly define therebetween a substantially triangular space or opening 44.

Figure 9:
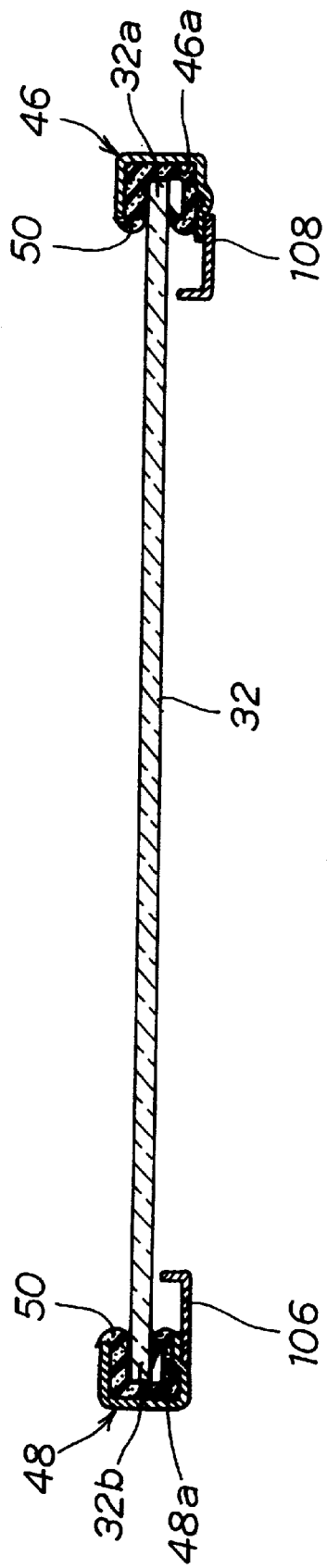
FIG. 9 is a cross-sectional view taken along line IX—IX of FIG. 8.

The sash body 34 of the foregoing construction projects upwardly from the upper edge 22a (FIG. 2) of the door body 22. The sash body 24 further includes parts or members extending downwardly to form an integral lower half or portion of the window sash assembly 24. These members include a rear run channel 46 extending continuously and downwardly from the lower end of the rear vertical frame portion 36. The rear run channel 46 has a longitudinal guide groove 46a extending continuously and downwardly from a lower end of the guide groove 36b of the vertical rear frame portion 36 for receiving and guiding the rear edge portion 32a of the window panel 32 as the window panel 32 is raised and lowered. Similarly, a front run channel 48 is provided, extending continuously and downwardly from the lower end of the front vertical frame portion 42 for receiving and guiding the front edge 32b of the window panel 32 as the window panel 32 is raised and lowered. To this end, the front run channel 48 has a longitudinal guide groove 48a extending continuously and downwardly from a lower end of the guide groove 42a of the front vertical frame portion 42. The guide groove 48a in the front run channel 48 and the guide groove 46a in the rear run channel 46 confront each other, as shown in FIG. 9. The front and rear run channels 48, 46 are equipped with a channel-shaped continuous seal member, such as a weatherstrip 50 fitted in the respective guide grooves 48a, 46a. Though not shown, the weatherstrip 50 is also fitted in the guide grooves in the rear vertical frame portion 36, the upper frame portion 38, and the front vertical frame portion 42.

Figure 15:
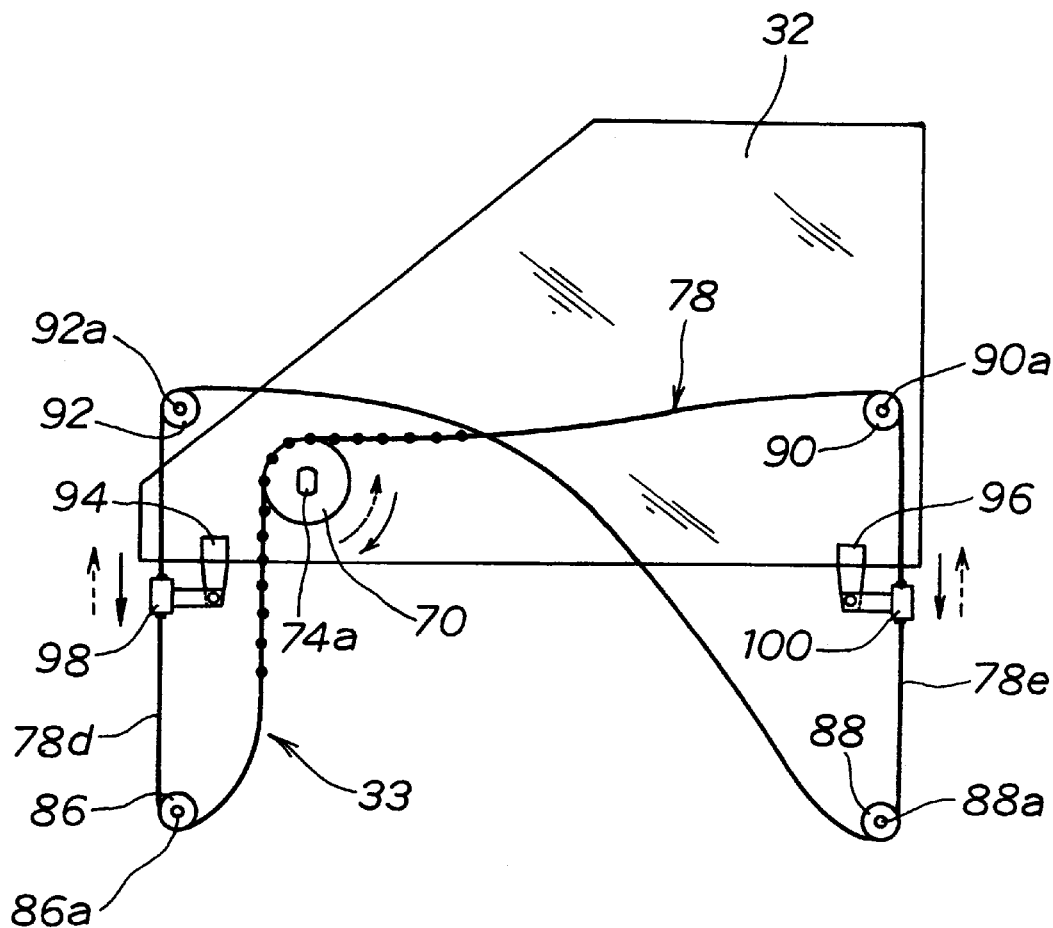
FIG. 15 is a diagrammatical view showing the principle of operation of the window regulator.

Either the joint portion between the front vertical frame portion 42 and the front run channel 48, or alternatively the joint portion between the rear vertical frame portion 36 and the rear run channel 46 carries thereon a bracket 52 which supports thereon a drive unit or mechanism of the window regulator 33 (FIG. 15). In the illustrated embodiment, the bracket 52 is mounted on the first-mentioned joint portion. As will be understood from the following description, the bracket 52 serves also as a joint member which joins or interconnects a lower portion of the front vertical frame portion 42 and an upper portion of the front run channel 48 to thereby form a single, substantially continuous run channel.

Figure 10:
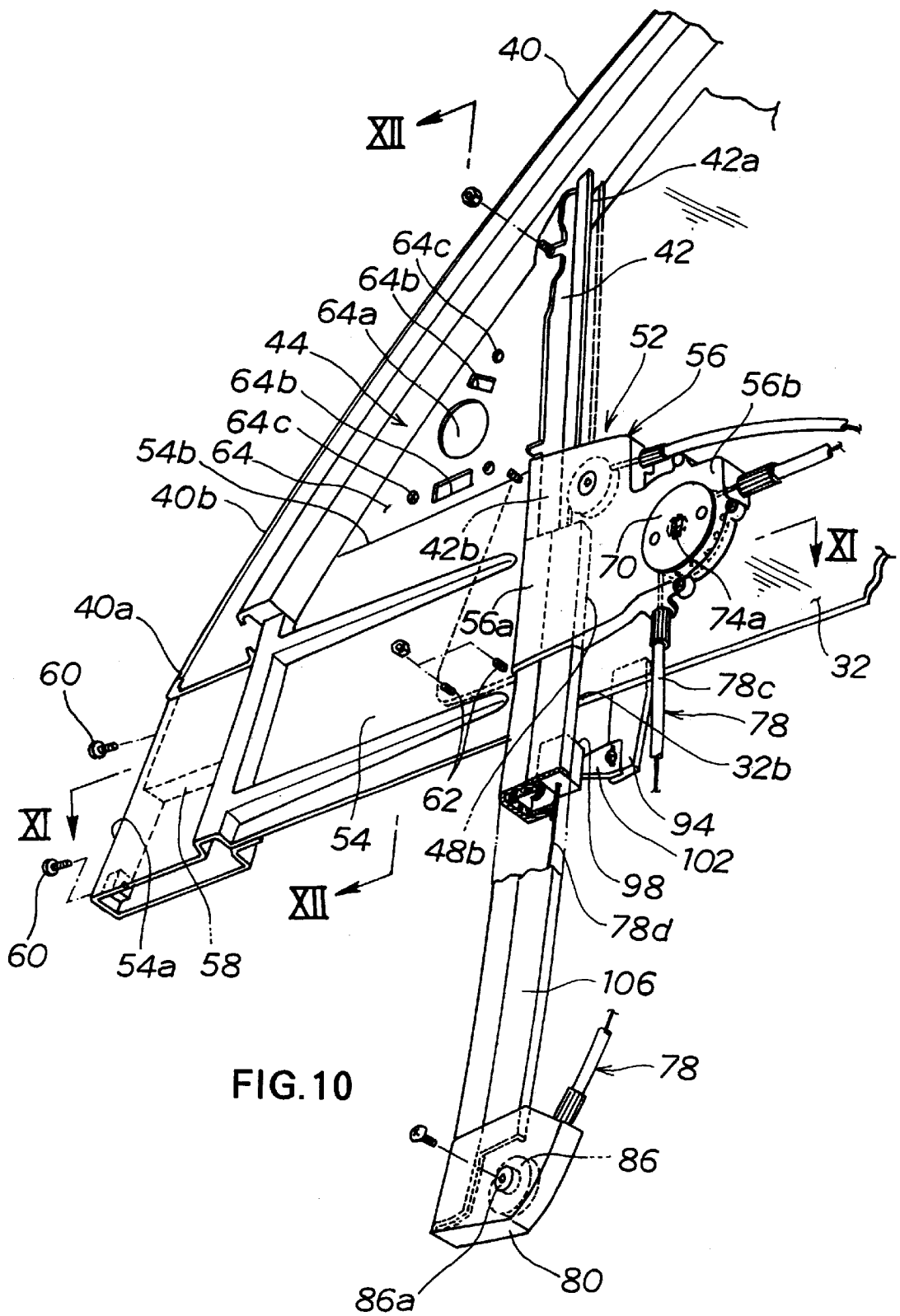
FIG. 10 is an enlarged perspective view of a front portion of the window sash assembly.
Figure 11:
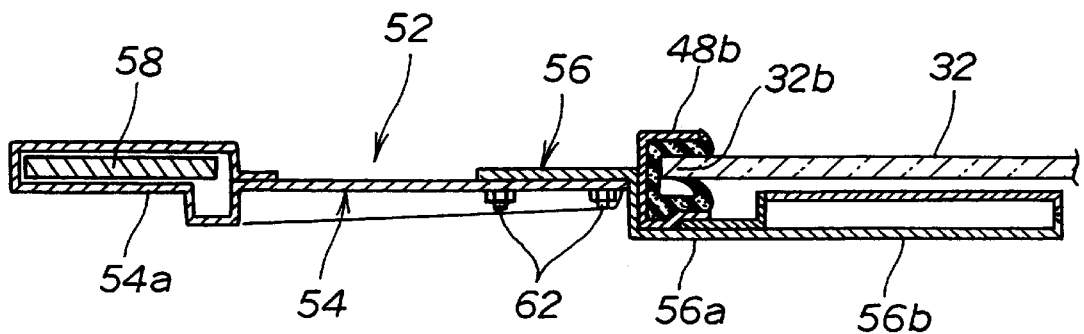
FIG. 11 is a cross-sectional view taken along line XI—XI of FIG. 10.

The bracket 52 is composed of two parts, i.e., a front part 54 and a rear part 56 extending horizontally in opposite directions from the junction between the front vertical frame portion 42 and the front run channel 48. The rear part 56 has the function of a joint member. The front part 54 has a front end portion 54a formed into a hollow shape, as shown in FIGS. 10 and 11. The hollow front end portion 54a receives therein a stay 58 extending downwardly from a front end 40a of the front frame portion 40. The stay 58 and the front end portion 54a of the front part 54 are connected together by a plurality of screws 60 (FIG. 10), for example. In the illustrated embodiment, the front part 54 and the rear part 56 of the bracket 52 are formed by two separate members structurally independent from each other. The front part or member 54 and the rear part or member 56 are overlapped with each other at their one end, and at these overlapped portions, they are connected together by a plurality of screws 62 (FIG. 10), for example.

The front member 54 of the bracket 52 is located below the triangular opening 44 formed in the front portion of the sash body 34 such that a straight top edge 54b of the front member 54 defines a bottom side of the triangular opening 44. Thus, the triangular opening 44 is defined or surrounded by the top edge 54b of the front member 54, a front end part 40b of the front frame portion 40, and the front vertical frame portion 42. The triangular opening 44 is closed by a mirror base 64 fitted therein for mounting a door mirror 66 (FIG. 8). The mirror base 64 is comprised of a triangular plate member and has a shape complementary in contour to the shape of the triangular opening 44.

In the illustrated embodiment, the door mirror 66 is a foldable door mirror and attached to the mirror base 64 fitted in the triangular opening 44. As an alternative, it is possible according to the invention to use a bracket having an upwardly extended portion, and to attach the door mirror 66 to the upwardly extended bracket portion.

The rear member 56 of the bracket 52 has a front end portion 56a fitted with a lower end 42b of the front vertical frame portion 42 to join or unite the bracket 52 and the front vertical frame portion 42. Similarly, an upper end 48b of the front run channel 48 is fitted with the front end portion 56a of the rear member 56 to join or unite the bracket 52 and the front run channel 48. Thus, the front vertical frame portion 42 and the front run channel 48 are connected end to end and held in vertical juxtaposition by means of the front end portion 56a of the rear member 56 of the bracket 52.

Figure 14:
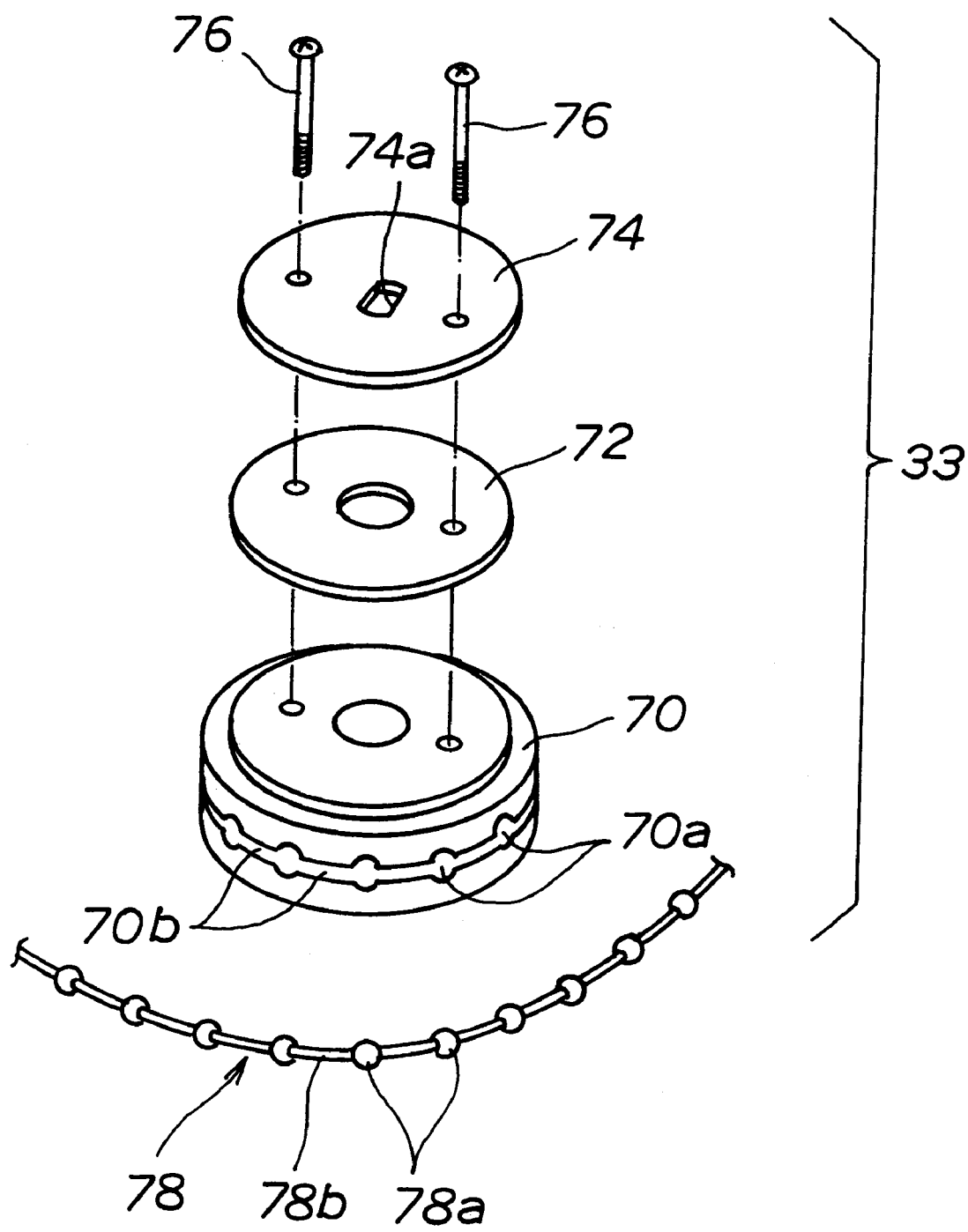
FIG. 14 is an exploded perspective view of a drive unit of a window winder or regulator.

The rear member 56 of the bracket 52 further has a rear end portion 56b formed into an elongated rectangular hollow box-like configuration. As shown in FIG. 11, the hollow box-like rear end portion 56b has a width (an extent in the widthwise direction of the vehicle) which is much smaller than the length (an extent in the longitudinal direction of the vehicle) of the same. The hollow box-like rear end portion 56b rotatably holds therein a drive pulley 70 which forms part of the drive unit of the window regulator 33 (FIG. 15). As shown in FIG. 14, the drive pulley 70 is assembled with an inner washer 72 and an outer washer 74 by means of a pair of screws 76, with the inner washer 72 disposed between the drive pulley 70 and the outer washer 74. The outer washer 74 has a central square hole 74a for receiving therein an end of a window regulator handle or crank (not shown) to drive or rotate the drive pulley 70.

The drive pulley 70 has, in its outer peripheral surface, a series of regularly spaced hemispherical recesses 70a and a series of discrete circumferential grooves 70b interconnecting the adjacent hemispherical recesses 70a. The hemispherical recesses 70a and the circumferential grooves 70b snugly receive therein a longitudinal portion of a drive wire 78. The drive wire 78 has a number of spherical beads 78a attached to a wire strand 78b at regular intervals for engagement with the hemispherical recesses 70a in the drive pulley 70. The wire strand 78b is guided and received in the circumferential grooves 70b in the drive pulley 70. As shown in FIGS. 8 and 10, the drive wire 78 is covered or concealed with a tubular cover or sheath 78c in which instance the sheath 78c constitutes an outer wire, and the beaded wire strand 78b constitutes an inner wire.

As shown in FIG. 8, the drive pulley 70 which is assembled with the inner and outer washers 72, 74 has an end face exposed to the obverse side (room interior side) of the bracket 52, with the square hole 74a opening toward the room interior side. It is, therefore, possible to set the window regulator handle (not shown) on the drive pulley 70 by inserting one end of the window regulator handle into the square hole 74a from the room interior side. When the window regulator handle is actuated to turn or rotate the drive pulley 70, the drive wire 78 is driven by the drive pulley 70 in a direction to raise or lower the window panel 32.

A first support arm 80 is attached to a lower end of the front run channel 48 and projects therefrom toward a lower end of the rear run channel 46. Similarly, a second support arm 82 is attached to the lower end of the rear run channel 46 and projects therefrom toward the first support arm 80. The rear run channel 46 is further provided with a third support arm 84 projecting from an upper end of the rear run channel 46 toward the bracket 52. The support arms 80, 82, 84 rotatably hold thereon first, second and third guide pulleys 86, 88 and 90, respectively. The guide pulleys 86, 88, 90 are rotatably mounted on first, second and third shafts 86a, 88a and 90a, respectively, attached to the corresponding support arms 80, 82, 84. The support arm 80 and the support arms 82, 84 may be formed integrally with the front run channel 48 and the rear run channel 46, respectively. The rear member 56 of the bracket 52 supports thereon a fourth guide pulley 92 rotatably mounted thereon by a fourth shaft 92a attached to the rear bracket member 54. The fourth guide pulley 92 is disposed directly above the first guide pulley 86. All the guide pulleys 86–92 have a circumferential groove (not shown) for receiving and guiding the beaded drive wire 78 in a like manner as the discrete circumferential grooves 70b of the drive pulley 70.

The drive wire 78 extends around the drive pulley 70 and the guide pulleys 86–92 in the manner diagrammatically shown in FIG. 15. Stated more specifically, the drive wire 78 first extends around an upper part of the drive pulley 70, and then goes down toward the first guide pulley 86. After it extends around a lower part of the first guide pulley 86, the drive wire 78 goes up toward the fourth guide pulley 92, and then extends around an upper part of the fourth guide pulley 92 disposed directly above the first guide pulley 86. Thereafter, the drive wire 78 takes a course diagonally down toward the second guide pulley 88, then extends around a lower part of the second guide pulley 88, and subsequently goes up toward the third guide pulley 90. After it extends around an upper part of the third guide pulley 90 disposed directly above the guide pulley 88, the drive wire 78 finally returns to the drive pulley 70. The thus extending drive wire 78 draws a distorted generally horizontal 8 figure.

Figure 13:
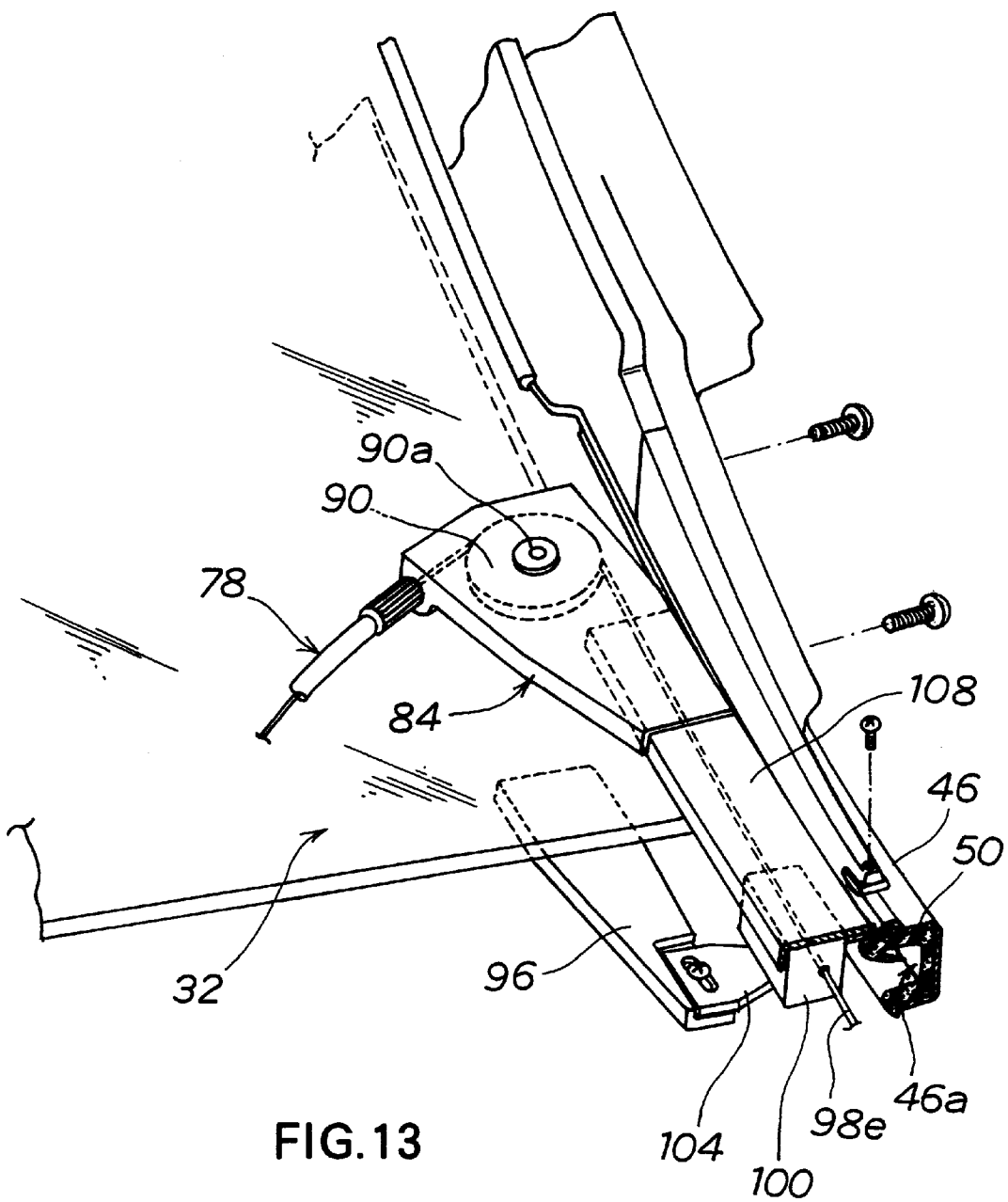
FIG. 13 is a perspective view, with parts cut away for clarity, of a rear run channel of the window sash assembly.

The window panel 32 includes front and rear stays 94, 96 attached to (or formed integrally with) a lower edge of the window panel 32 near the front and rear ends thereof. The front and rear stays 94, 96, respectively, are connected or linked with front and rear sliders 98, 100 via front and rear link plates 102, 104 (FIGS. 10 and 13). The front slider 98 is attached to a vertically extending first longitudinal portion 78d of the drive wire 78 (extending between the first guide pulley 86 and the fourth guide pulley 92). Similarly, the rear slider 100 is attached to a vertically extending second longitudinal portion 78e of the drive wire 78 (extending between the second guide pulley 88 and the third guide pulley 90). The sliders 98, 100 thus arranged are simultaneously movable up and down along the front and rear run channels 48, 46 when the drive wire 78 is forced to travel along a generally horizontal 8-figured path (FIG. 15) in synchronism with rotation of the drive pulley 70. To secure stable movement of the sliders 98, 100, an angled front guide strip 106 and an angled rear guide strip 108 are attached to the front and rear run channels 48, 46, respectively, for guiding the sliders 98, 100. Each of the guide strips 106, 108 extends at least over a longitudinal portion of the corresponding run channel 48, 46 which defines a range of reciprocating movement of the sliders 98, 100.

More particularly, when the non-illustrated window regulator handle is actuated to rotate the drive pulley 70 either in the clockwise direction indicated by the solid-lined arrow shown in FIG. 15, or in the counterclockwise direction indicated by the broken-lined arrow shown in FIG. 15, the rotating drive pulley 70 forces the drive wire 78 to move in one particular direction along the horizontal 8-figured path, with the drive wire 78 being guided by the guide pulleys 86–92.

With this movement of the drive wire 78, the first and second longitudinal portions 78d, 78e of the drive wire 78 (extending respectively between the first guide pulley 86 and the fourth guide pulley 92 and between the second guide pulley 88 and the third guide pulley 90) concurrently move either in the downward direction indicated by the solid-lined arrow shown in FIG. 15, or in the upward direction indicated by the broken-lined arrow in the same figure so that the sliders 98, 100 attached to the respective longitudinal portions 78d, 78e are lowered or raised simultaneously while they are guided by the guide strips 106, 108. The window panel 32 which is linked with the sliders 98, 100 via the stays 94, 96 and the link plates 102, 104 can, therefore, be lowered and raised in immediate response to the downward and upward movement of the sliders 98, 100. During that time, the front and rear edges 32b, 32a of the window panel 32 are stably guided along the respective guide grooves 48a, 42a, 46a, 36b of the front run channel 48, front vertical frame portion 42, rear run channel 46 and rear vertical frame portion 36.

As described above, the window sash assembly 24 of the present invention includes front and rear run channels 48, 46 attached to a lower part of the sash body 34 which may be structurally the same as one used in a conventional window sash assembly. The front run channel 48 is joined or connected to the front vertical frame portion 42 of the sash body 34 by a bracket 52 on which a drive pulley 70 forming part of a drive unit of a window winder or regulator 33 (FIG. 15) is mounted. The bracket 52 has a forwardly extended front end portion supporting thereon a curved front end of the sash body 34. The bracket 52 has a front part defining, together with a front part of the sash body 34 and the front vertical frame portion 42, a substantially triangular opening 44 in which a mirror base 64 is fitted to close the opening 44 and to support a door mirror 66. Since the opening 44 is closed by the mirror base 64, the front portion of the sash body 34 including the opening 44 is rigid and has a relatively high mechanical strength.

The window regulator 33 is assembled as an integral part of the window sash assembly 24. By using the window sash assembly 24, it is possible to omit a conventional assembling process which has been performed to attach a window regulator and its support mechanism to the inside surface of an outer door panel separately from a process of assembling a window sash body to the door body. With this omission of the conventional assembling process, the door assembling time can be reduced greatly.

In the illustrated embodiment, the window regulator 33 (FIG. 15) includes a plurality of guide pulleys 86, 88, 90 mounted on the front and rear run channels 48, 46 of the window sash assembly 24, a similar guide pulley 92 mounted on the bracket 52 together with the drive pulley 70, and an endless drive wire 78 extending around the drive pulley 70 and the guide pulleys 86–92 in a predetermined pattern. The window panel 32 is previously set or assembled in the sash body 34 of the window sash assembly 24 in such a manner that the window panel 32 held in the sash body 34 can be smoothly raised or lowered by the window regulator 33. If necessary, the relative position of the sash body 34, the window panel 32 and the window regulator 33 is adjusted to secure accurate alignment between the window panel 32 and the sash body 34 and reliable operation of the window regulator 33. No such adjustment is needed once the window sash assembly 24 is attached to the door body 22. In other words, when a process of assembling the window sash assembly 24 with the door body 22 is completed, the window panel 32 is automatically placed in a ready-to-use condition (i.e., the window panel 32 can be raised and lowered).

The window regulator 33 in the illustrated embodiment is of the manual-operated type. The manual window regulator may be replaced by a power window regulator (not shown) in which instance an electric motor is used to drive the drive wire 78 in place of the drive pulley 70.

Figure 12:
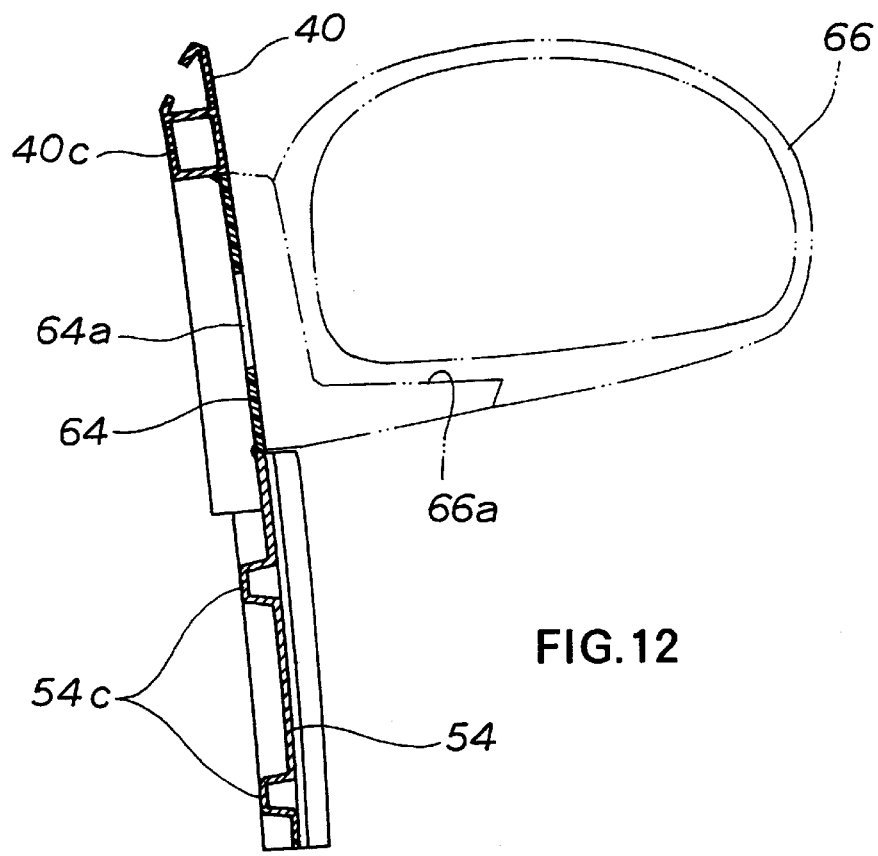
FIG. 12 is a cross-sectional view taken along line XII—XII of FIG. 10.

The mirror base 64 may be made of metal or plastics. In the illustrated embodiment, the mirror base 64 is composed of a substantially triangular plate-like base molded of synthetic resin and has a central circular hole 64a through which a manual mirror actuator lever (not shown) projects into the room interior side of the motor-vehicle. The mirror base 64 also has a plurality of elongated rectangular holes 64b for locking engagement with prongs on a block-like base portion 66a (FIG. 12) of the folding door mirror 66, and a plurality of screw holes 64c for attachment of the door mirror 66 to the mirror base 64 by means of screws (not shown). As shown in FIG. 12, the mirror base 64 is joined by welding or bonding to the front frame portion 40 and the front member 54 of the bracket 52. In order to reinforce or strengthen an area surrounding the mirror base 64, the front frame portion 40 has a closed hollow reinforcement rib 40c, and the front member 54 has a plurality of hollow reinforcement ribs 54c.

Referring back to FIG. 1, there is shown a motor-vehicle door 20 in which the window sash assembly 24 of the foregoing construction is incorporated. In the illustrated embodiment, the door 20 is molded of synthetic resin.

The vehicle door 20 is assembled such that an upper half of the window sash assembly 24 including the front, upper and rear frame portions 40, 38, 36 of the the sash body 34 are exposed above an upper edge 22a of the door body 22, and a lower half of the window sash assembly 24 including the front and rear run channels 48, 46 are located below the upper edge 22a of the door body 22 and received between the inner and outer door panels 26, 28.

Figure 5:
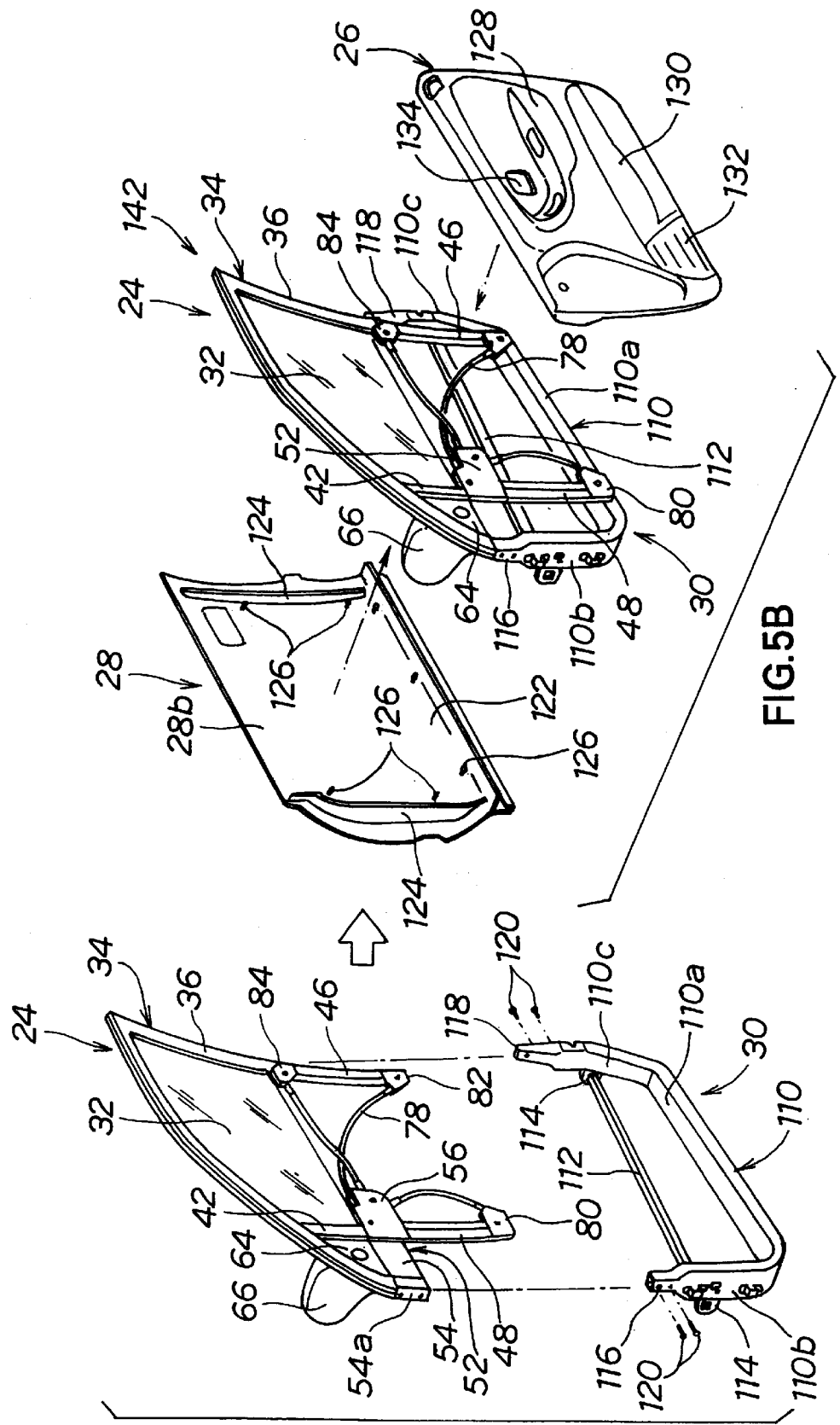
FIG. 5A is an exploded perspective view illustrative of the manner in which a window sash assembly and a door frame member are assembled together to form a sash-and-frame assembly according to a first embodiment of a motor-vehicle door assembling method of the present invention.
FIG. 5B is a view similar to FIG. 5A, showing the manner in which inner and outer door panels are assembled with the sash-and-frame assembly to form an assembled motor-vehicle door according to the first embodiment of the motor-vehicle door assembling method.

As shown in FIG. 5A, the door frame member 30 of the door body 22 has a generally U-shaped frame body 110 molded of synthetic resin and including an elongated base 110a and front and rear upright stems 110b, 110c integral with and extending upwardly from opposite ends of the elongated base 110a. The U-shaped frame body 110 may be formed by bending a rectangular metal tube into a generally U shape configuration.

The door body 22 further has a horizontal impact beam 112 extending between the front and rear upright stems 110b, 110c at one side (exterior side in the illustrated embodiment) of the frame body 110. The impact beam 112 serves also as a reinforcing member of the frame body 110. The impact beam 112 is supported at opposite ends by a pair of stays 114, 114 attached to respective intermediate portions of the upright stems 110c, 110c. The impact beam 112 is formed from a plastic pipe, preferably a fiber-reinforced plastic pipe, having a rectangular cross section, such as shown in FIGS. 2 and 5A. As an alternative, a metal pipe having a circular cross section may be used.

The upright stems 110b, 110c each have an upper end portion forming an integral sash-attachment portion 116, 118. The front sash-mounting portion 116 is constructed such that it fits with a lower half of the hollow front end portion 54a of the front bracket member 54 of the window sash assembly 24, as shown in FIG. 5B. The front end portion 54a and the front sash-attachment portion 116 are firmly connected together by a suitable fastener, such as a plurality of screws 120 (FIG. 5A). On the other hand, the rear sash-attachment portion 118 is so constructed as to overlap a lower end portion of the rear vertical frame portion 36 in the fore-and-aft direction of the door frame member 30, as shown in FIG. 5B. The thus overlapped lower end portion and rear sash-attachment portion 118 are firmly connected together by a suitable fastener, such as a plurality of screws 120 (FIG. 5A).

In the illustrated embodiment, the inner and outer door panels 26, 28 of the door body 22 are molded of synthetic resin, such as polypropylene. At least the outer door panel 28 has a coated or otherwise plated outside surface (obverse surface) 28a. The inner and outer door panels 26, 28 may be made of metal, such as steel.

As shown in FIG. 5B, the outer door panel 28 has a panel body 122 curved outwardly, and a pair of vertical end plates 124 projecting from an inside surface (reverse surface) 28b of the panel body 122 along front and rear edges of the panel body 122, respectively. The outer door panel 28 further has a plurality of locking projections 126 formed integrally with the inside surface 28b of the panel body 122 for locking engagement with mating openings 136 (FIG. 3) formed in the door frame member 30 and the impact beam 112. The locking projections 126 are arranged or distributed in a suitable pattern, and in the case of the illustrated embodiment, they are arranged along opposed inner sidewalls of the end plates 124, along a lower edge of the panel body 122, and along an intermediate portion of the panel body 122 extending between the end plates 124.

The inner door panel 26 has an integral door lining (trim panel) on its obverse side (interior side). The interior side of the inner door panel 26 is provided with an armrest 128, an accessary pocket 130 and a speaker grille 132 both disposed below the armrest 128, and a rectangular opening 134 located above the armrest 128 for enabling the window regulator handle (not shown) to be actuated from the room interior side of the motor-vehicle. As shown in FIG. 2, the inner door panel 26 also has a plurality of locking projections 126 (see FIG. 3) formed integrally with an inside surface (reverse surface) 26a of the inner door panel 26 for locking engagement with mating locking holes 136 (FIG. 3) formed in the door frame member 30, in the same manner as the locking projections 126 on the outer door panel 28 previously described.

As shown in FIG. 2, the inner and outer door panels 26, 28 are attached to the opposite sides of the door frame member 30 via the locking engagement between the locking projections 126 and the locking holes 136, with one spacer 138 (140) disposed between each door panel 26, 28 and the door frame member 30. The spacer 138 is an upper spacer disposed between the inner door panel 26 and the door frame member 30 at a higher level than the impact beam 112, and the spacer 140 is a lower spacer disposed between the outer door panel 28 and the door frame member 30 at a lower level than the impact beam 112. The number of the spacers 138, 140 is changed depending on the design requirements of the motor-vehicle door, and as the case may be, these spacers 138, 140 can be omitted.

Figure 3:
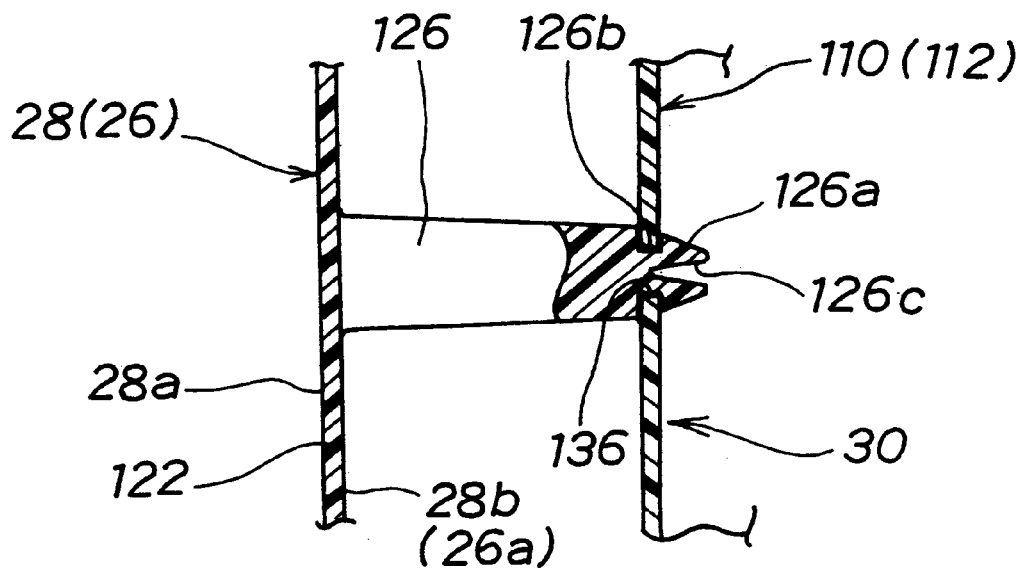
FIG. 3 is an enlarged view of a portion of FIG. 2, showing a snap-fit joint structure between each door panel and a door frame member of the motor-vehicle door.

FIG. 3 illustrates a joint structure formed between each of the locking projections 126 and a corresponding one of the locking holes 136 in the door frame member 30. The locking projection 126 has a split, enlarged locking head 126a and a reduced neck 128 directly behind the locking head 126a. By virtue of a slit 126c formed therein, the split locking head 126a is deformable into a radially compressed configuration when it is compressed in a radial inward direction. The split locking head 126a is tapered to facilitate smooth radial inward deformation of the split locking head 126a when the locking projection 126 is forced into the locking hole 13 to join the door frame member 30 and each door panel 26, 28, in a manner described later. In order to form a snap-fit joint, a maximum outside diameter of the split locking head 126a is determined such that when the split locking head 126a is in its free (undeformed) state, the maximum outside diameter is sufficiently larger than the diameter of the locking hole 136 to secure locking engagement between itself and a peripheral edge of the locking hole 136, and when the split locking head 126a is radially compressed, the maximum outside diameter is substantially equal to or slightly smaller than the diameter of the locking hole 136 to allow the locking projection 126 to be removed from the locking hole 136. The neck 126b has an outside diameter substantially the same as or slightly smaller than the inside diameter of the locking hole 136.

By virtue of the snap-fit joint, the inner and outer door panels 26, 28 are releasably connected to the door frame member 30. Stated in other words, each door panel 26, 28 can be detached from the door frame member 30 by pulling it in a direction away from the door frame member 30. When the door panel 26, 28 is pulled, the split locking heads 126a of the respective locking projections 126 are deformed into a radially compressed configuration, allowing the locking projections 126 to be removed from the corresponding locking holes 136 in the door frame member 30 (and in the impact beam 112). The releasably connected door panels 26, 28 facilitate easy maintenance of the window regulator 33 and recycling of the materials used.

When the inner door panel 26, the outer door panel 28 and the door frame member 30 are assembled together, the front and rear ends of the door frame member 30 are closed or concealed by the end plates 124, 124 (FIG. 5B) of the outer door panel 28. And, an upper edge of the inner door panel 26 and an upper edge of the outer door panel 28 jointly define therebetween an elongated opening 22b (FIG. 2) through which the sash body 34 of the window sash assembly 24 projects upwardly, as shown in FIG. 2. The front and rear run channels 48, 46 forming a lower half of the window sash assembly 24, and all the parts (see FIG. 8) mounted on the run channels 46, 46, that is, the bracket 52, the drive pulley 70, the support arms 80–84, the guide pulleys 86–92, and the drive wire 78 are received in an internal space of the door body 22.

Figure 4:
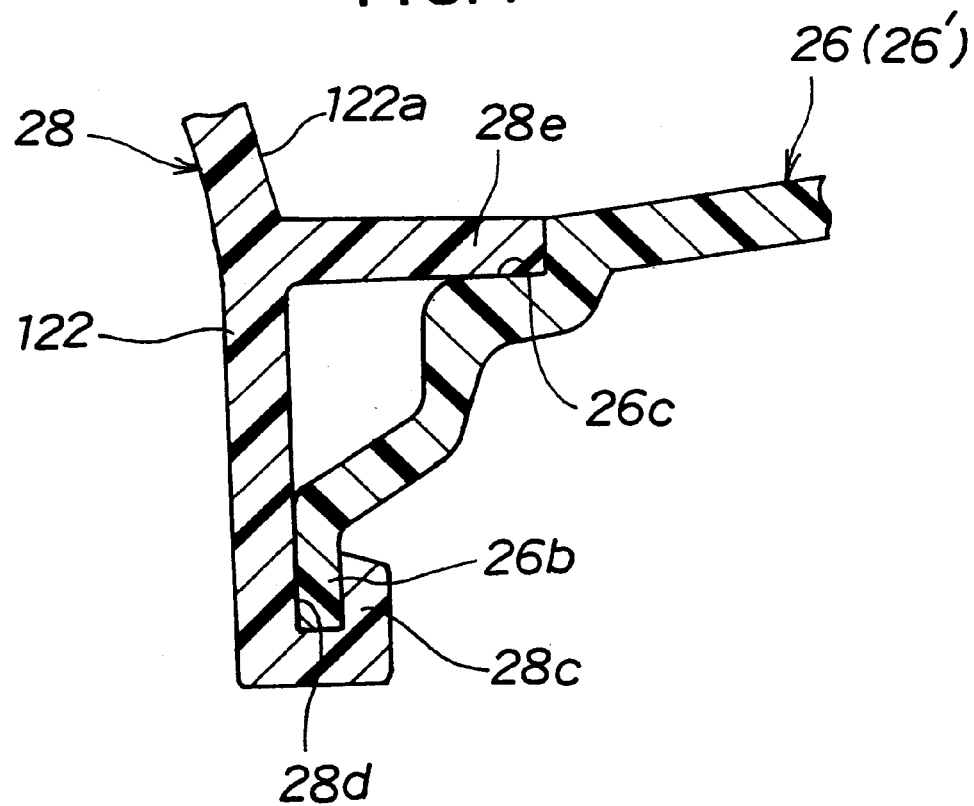
FIG. 4 is an enlarged view of a potion of FIG. 2, showing a joint structure between lower longitudinal edges of the inner and outer door panels.

Lower edges of the inner and outer door panels 26, 28 are joined together, as shown in FIGS. 2 and 4. As best shown in FIG. 4, the outer door panel 28 has, formed on its inside surface 28b, an L-shaped projection 28c extending longitudinally along the lower edge of the outer door panel 28 so as to define an upwardly open locking groove or recess 28d, and a horizontal wing 28e extending over the locking recess 28d. On the other hand, the lower edge of the inner door panel 26 has a vertical locking fin 26b snugly receivable in the locking recess 28d from above, and a horizontal step 26c located above the locking fin 26b for retaining thereon the horizontal wing 28e of the outer door panel 28. With this joint structure, the lower edge of the door body 22 is closed.

Referring now to FIGS. 5A and 5B, a first embodiment of a motor-vehicle door assembling method according to the present invention will be described in greater detail.

FIG. 5A illustrates the manner in which a window sash assembly 24 and a door frame member 30 are assembled together to form a sash-and-frame assembly (first assembling step). The window sash assembly 24 has the same structure as detailed above and, hence, no further description thereof is needed. Similarly, the door frame member 30 has the same structure as described above and, hence, further description thereof can be omitted. The window sash assembly 24 has been produced in advance.

At first, the window sash assembly 24 is held above the door frame member 30 with the front and rear end portions of the window sash assembly 24 being kept in vertical alignment with the front and rear sash-attachment portions 116, 118 of the door frame member 30, respectively.

Then, the window sash assembly 24 is set on an upper portion of the door frame member 30 in which instance the front end of the window sash assembly 24 is fitted with the front sash-attachment portion 116 of the door frame member 30, and the rear end portion of the window sash assembly 24 (including a lower end portion of the rear vertical frame portion 36 and an upper end portion of the rear run channel 46) is retained by an inner surface of the rear sash-attachment portion 118 of the door frame member 30.

Subsequently, the front and rear end portions of the window sash assembly 24 are firmly connected to the front and rear sash-attachment portions 116, 118 of the door frame member 30 by a plurality of screws 120. The thus assembled window sash assembly 24 and door frame member 30 jointly form a sash-and-frame assembly 142 (FIG. 5B).

FIG. 5B illustrates the manner in which the sash-and-frame assembly 142 is assembled with inner and outer door panels 26, 28 to form a motor-vehicle door (second assembling step). The inner and outer door panels 26, 28 are the same in construction as those previously described and, hence, no further description thereof is needed.

The inner and outer door panels 26, 28 are first disposed in confrontation to the opposite side surfaces of the door frame member 30 of the sash-and-frame assembly 142. In this instance, the locking projections 126 on the door panels 26, 28 are substantially held in registry with the corresponding locking holes 136 in the door frame member 30 including the impact beam 120.

Then, lower edges of the inner and outer door panels 26, 28 are interlocked with each other, as shown in FIG. 4, while the door frame member 30 of the sash-and-frame assembly 142 is being held between the inner and outer door panels 26, 28. Subsequently, the door panels 26, 28 are forced against the door frame member 30 so that the locking projections 126 on the door panels 26, 28 are snap-fit with the corresponding locking holes 136 in the door frame member 30, as shown in FIG. 3. Thus, a motor-vehicle door 20, such as shown in FIGS. 1 and 2, is produced.

The foregoing motor-vehicle door assembling method is simpler than the conventional method because only two assembling steps are needed to obtain an assembled motor-vehicle door 20 having a window regulator 33.

Figure 6:
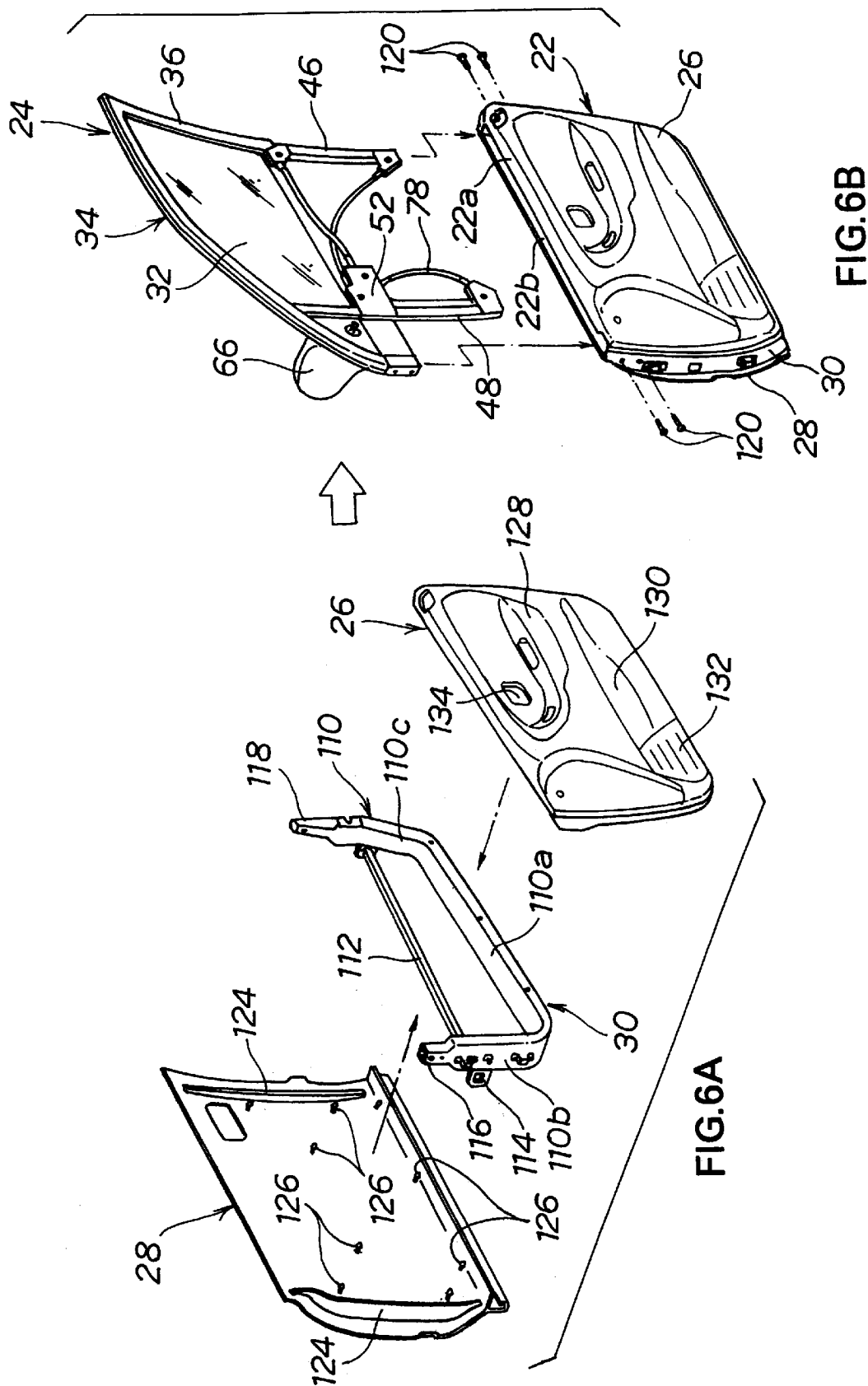
FIG. 6A is an exploded perspective view illustrative of the manner in which inner and outer door panels and a door frame member are assembled together to form a door body according to a second embodiment of the motor-vehicle door assembling method of the present invention.
FIG. 6B is a view similar to FIG. 6A, showing the manner in which a window sash assembly is assembled with the door body to form an assembled motor-vehicle door according to the second embodiment.

FIGS. 6A and 6B schematically show a second embodiment of the motor-vehicle door assembling method according to the present invention. A window sash assembly 24, a door frame member 30, an inner door panel 26 and an outer door panel 28 used in this embodiment are the same as those in the first embodiment described above with reference to FIGS. 5A and 5B, and a further description of these parts can be omitted.

At first, as shown in FIG. 6A, the inner door panel 26 and the outer door panel 28 are disposed in confrontation to the opposite side surfaces of the door frame member 30. Then, the door panels 26, 28 and the door frame member 30 are assembled together partly by means of a snap-fit engagement between the locking projections 126 on the door panels 26, 28 and the mating locking holes 136 in the door frame member 30 (see FIG. 3), and partly by means of an interlocking engagement between the lower edges of the door panels 26, 28 (see FIG. 4). Thus, a door body 22, such as shown in FIG. 6B, is formed. The door body 22 has an elongate opening 22b extending along an upper edge 22a thereof.

Subsequently, as shown in FIG. 6B, the window sash assembly 24 (which has been produced in advance) is held above the door body 22 with the front and rear run channels 48, 46 being kept in registry with the opening 22b of the door body 22. Thereafter, the window sash assembly 24 is lowered toward the door body 22 so that a lower half of the window sash assembly 24 including the run channels 46, 48, and the bracket 52 is received in the door body 22. In this instance, the front and rear end portions of the lower half of the window sash assembly 24, and more particularly a front end portion of the bracket 52 and an upper end portion of the rear run channel 46 are respectively fitted with the front and rear sash-attachment portions 116, 118 (FIG. 6A) of the door frame member 30. Then, by using a plurality of screws 120, the window sash assembly 24 is firmly connected to the sash-attachment portions 116, 118 of the door frame member 30 of the door body 22. Thus, a fully assembled motor-vehicle door 20, such as shown in FIGS. 1 and 2 is produced.

According to the second embodiment of the motor-vehicle door assembling method, a motor-vehicle door 20 can be assembled only by two assembling steps which are smaller in number than those required in the conventional assembling method.

Figure 7:
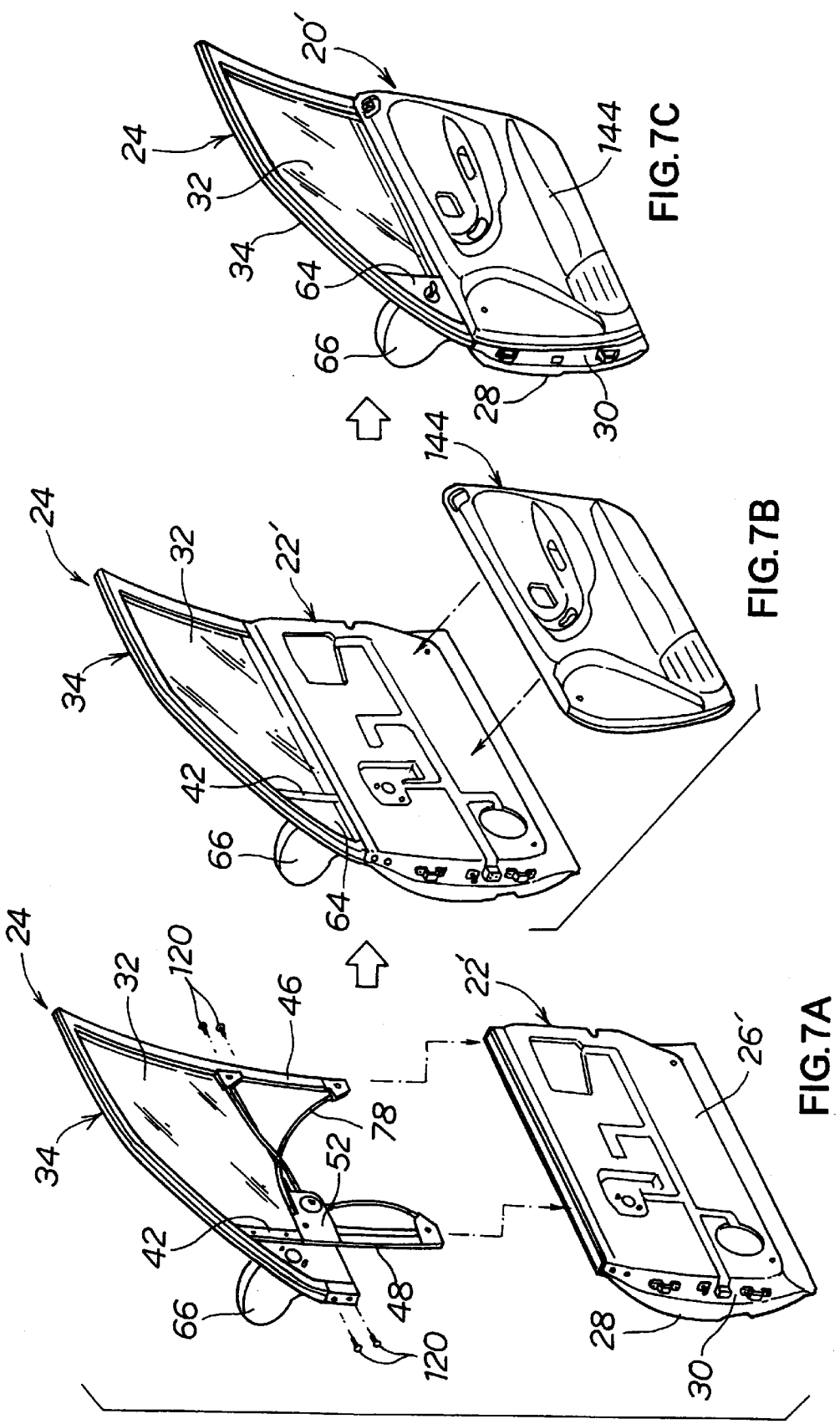
FIG. 7A is an exploded perspective view illustrative of the manner in which a window sash assembly and a door body are assembled together to form a semi-finished motor-vehicle door according to a third embodiment of the motor-vehicle door assembling method of the present invention.
FIG. 7B is a view similar to FIG. 7A, showing the manner in which an inner door lining is attached to the semi-finished door assembly to form an assembled motor-vehicle door according to the third embodiment.
FIG. 7C is a perspective view showing the assembled motor-vehicle door according to the third embodiment.

FIGS. 7A through 7C schematically show a third embodiment of the motor-vehicle door assembling method according to the present invention. This embodiment is a variant of the second embodiment just described above with reference to FIGS. 6A and 6B and, hence, description given below is limited to differences between these two embodiments.

Firstly, as shown in FIG. 7A, a door body 22 is assembled by joining together an outer door panel 28, a door frame member 30, and an inner door panel 26' via a snap-fit engagement between locking projections 126 on each door panel 28, 26' and mating locking holes 136 in the door frame member 30 (see FIG. 3) and also via an interlocking engagement between the lower edges of the door panels 26', 28 (see FIG. 4). Unlike the inner door panel 26 of the second embodiment shown in FIG. 6B, the inner door panel 26' of the third embodiment is free from an inner lining.

Then, a window sash assembly 24 which has been produced in advance is assembled with the door body 22 by inserting a lower half of the window sash assembly 24 from above into an internal space in the door body 22. The window sash assembly 24 and the door body 22 are firmly connected together by a plurality of screws 120.

Subsequently, an inner lining 144 is attached to an outside surface (obverse side) of the inner door panel 26', as shown in FIG. 7B. Thus, a motor-vehicle door 20', such as shown in FIG. 7C, is produced.

The inner lining 144 may be attached to the outside surface of the inner door panel 26' before the window sash assembly 24 is assembled with the door body 22.

Obviously, various minor changes and modifications of the present invention are possible in the light of the above teaching. It is therefore to be understood that within the scope of the appended claims the invention may be practiced otherwise than as specifically described.

What is claimed is:

1. A motor-vehicle door, comprising:
   a door body including an outer door panel, an inner door panel and a door frame member connected together, with said door frame member disposed between said outer and inner door panels, each of said outer and inner door panels being releasably connected to a corresponding one of opposite sides of said door frame member, said door frame member having a plurality of locking holes on each of said opposite sides and each of said outer and inner door panels having a plurality of locking projections snap-fitted with said locking holes in said door frame member, respectively; and
   a window sash assembly connected to an upper part of said door frame member, said window sash assembly including a sash body, a window panel vertically movably held in said sash body, and a window regulator mounted on a lower portion of said sash body for moving said window panel up and down and holding it in position.

2. A motor-vehicle door according to claim 1, wherein said locking projections each have an enlarged locking head having a maximum outside diameter larger than a diameter of said locking holes to interlock said locking projections and said door frame member, said locking head being split and deformable into a radially compressed configuration releasable from said locking holes to allow said locking projections to be disengaged from said door frame member.

3. A motor-vehicle door according to claim 1, wherein one of said outer door panel and said inner door panel has an L-shaped projection extending along a lower edge thereof so as to define an upwardly open locking recess, and a horizontal wing extending over said locking recess, and the other door panel has a vertical locking fin extending along a lower edge thereof and snugly received in said locking recess, and a horizontal step located above said locking fin to retain thereon said horizontal wing of said one door panel.

4. A motor-vehicle door, comprising:
   a door body including an outer door panel, an inner door panel and a door frame member connected together, with said door frame member disposed between said outer and inner door panels; and
   a window sash assembly connected to an upper part of said door frame member said window sash assembly including a sash body, a window panel vertically movably held in said sash body, and a window regulator mounted on a lower portion of said sash body for moving said window panel up and down and holding it in position, said sash body having a generally inverted U-shaped configuration including a front vertical frame portion and a rear vertical frame portion, said window sash assembly further including a front run channel extending continuously and downwardly from a lower end of said front vertical frame portion, and a rear run channel extending continuously and downwardly from a lower end of said rear vertical frame portion, said window panel having a front edge portion and a rear edge portion received in and guided along said front vertical frame portion and said front run channel, and said rear vertical frame portion and said rear run channel, respectively, as said window panel moves up and down, and said window regulator having a drive unit mounted on one of said front run channel and said rear run channel via a bracket for raising and lowering said window panel.

5. A motor-vehicle door according to claim 4, wherein said bracket forms a joint member which joins together said one run channel and a corresponding one of said front vertical frame portion and said rear vertical frame portion.

6. A motor-vehicle door according to claim 5, wherein said one run channel is said front run channel.

7. A motor-vehicle door according to claim 6, said window sash assembly further includes a door mirror attachable to said bracket.

8. A motor vehicle door according to claim 7, wherein said door sash body has a slanted front end portion spaced forwardly from said front run channel, said bracket has a portion extending between said slanted front end portion of said door sash body and said front run channel so as to define, between said slanted front end portion of said door sash body and said portion of said bracket, a substantially triangular opening, and said door mirror is attached to said bracket via a substantially triangular mirror base fitted in said triangular opening.

9. A motor-vehicle door according to claim 4, wherein said drive unit includes a drive pulley rotatably mounted on said bracket and an endless drive wire connected to said window panel and drivable by said drive pulley to move said window panel up and down in response to rotation of said drive pulley, said drive pulley having a plurality of hemispherical recesses formed in a circumferential surface thereof, said drive wire having a number of spherical beads attached to a continuous wire strand at regular intervals and receivable in said hemispherical recesses in said drive pulley.

10. A motor-vehicle door according to claim 9, wherein said window regulator further includes a plurality of guide pulleys for guiding said drive wire to travel along a predetermined path, said guide pulleys including a first guide pulley rotatably mounted on said one run channel, a second guide pulley rotatably mounted on the other run channel, a third guide pulley rotatably mounted on said other run channel at a position directly above said second guide pulley, and a fourth guide pulley rotatably mounted on said bracket at a position directly above said first guide pulley.

11. A motor-vehicle door according to claim 10, wherein said drive wire further includes a first longitudinal portion movable along a path extending between said first and fourth guide pulleys, a second longitudinal portion movable along a path extending between said second and third guide pulleys, a first slider attached to said first longitudinal portion of said drive wire and linked with said window panel, and a second slider attached to said second longitudinal portion of said drive wire and linked with said window panel.

12. A window sash assembly for a motor-vehicle door, comprising:
   a sash body adapted to be assembled with an upper part of a door body of the motor-vehicle door, said sash body having a generally inverted U-shaped configuration including a front vertical frame portion and a rear vertical frame portion said window sash assembly further including a front run channel extending continuously and downwardly from a lower end of said front vertical frame portion, and a rear run channel extending continuously and downwardly from a lower end of said rear vertical frame portion;
   a window panel vertically movably held in said sash body, said window panel having a front edge portion and a rear edge portion received in and guided along said front vertical frame portion and said front run channel and said rear vertical frame portion and said rear run channel, respectively, as said window panel moves up and down; and a window regulator mounted on a lower portion of said sash body for moving said window panel up and down and holding it in position, said window regulator having a drive unit mounted on one of said front run channel and said rear run channel via a bracket for raising and lowering said window panel.

13. A window sash assembly according to claim 12, wherein said bracket forms a joint member which joins together said one run channel and a corresponding one of said front vertical frame portion and said rear vertical frame portion.

14. A window sash assembly according to claim 13, wherein said one run channel is said front run channel.

15. A window sash assembly according to claim 14, further including a door mirror attachable to said bracket.

16. A window sash assembly according to claim 15, wherein said door sash body has a slanted front end portion spaced forwardly from said front run channel, said bracket has a portion extending between said slanted front end portion of said door sash body and said front run channel so as to define, between said slanted front end portion of said door sash body and said portion of said bracket, a substantially triangular opening, and said door mirror is attached to said bracket via a substantially triangular mirror base fitted in said triangular opening.

17. A window sash assembly according to claim 12, wherein said drive unit includes a drive pulley rotatably mounted on said bracket and an endless drive wire connected to said window panel and drivable by said drive pulley to move said window panel up and down in response to rotation of said drive pulley, said drive pulley having a plurality of hemispherical recesses formed in a circumferential surface thereof, said drive wire having a number of spherical beads attached to a continuous wire strand at regular intervals and receivable in said hemispherical recesses in said drive pulley.

18. A window sash assembly according to claim 17, wherein said window regulator further includes a plurality of guide pulleys for guiding said drive wire to travel along a predetermined path, said guide pulleys including a first guide pulley rotatably mounted on said one run channel, a second guide pulley rotatably mounted on the other run channel, a third guide pulley rotatably mounted on said other run channel at a position directly above said second guide pulley, and a fourth guide pulley rotatably mounted on said bracket at a position directly above said first guide pulley.

19. A window sash assembly according to claim 18, wherein said drive wire further includes a first longitudinal portion movable along a path extending between said first and fourth guide pulleys, a second longitudinal portion movable along a path extending between said second and third guide pulleys, a first slider attached to said first longitudinal portion of said drive wire and linked with said window panel, and a second slider attached to said second longitudinal portion of said drive wire and linked with said window panel.

* * * * *